Jan. 10, 1939.  H. L. PRAY  2,143,330
AUTOMATIC WORM DRIVE BRAKE
Filed June 9, 1938    2 Sheets-Sheet 1

Inventor
H. L. Pray

By Clarence A. O'Brien
and Hyman Berman
Attorneys

Jan. 10, 1939.  H. L. PRAY  2,143,330
AUTOMATIC WORM DRIVE BRAKE
Filed June 9, 1938  2 Sheets-Sheet 2
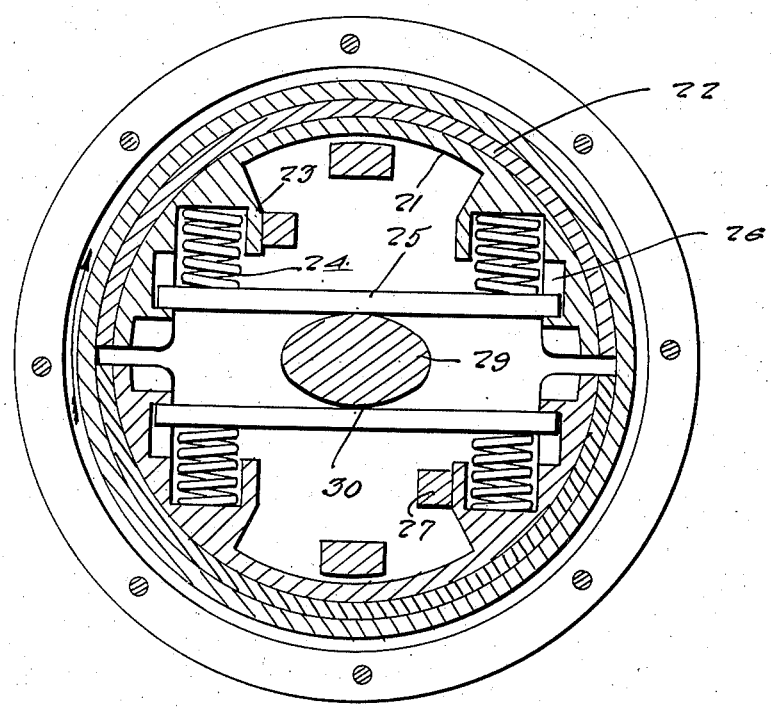
Fig. 2.
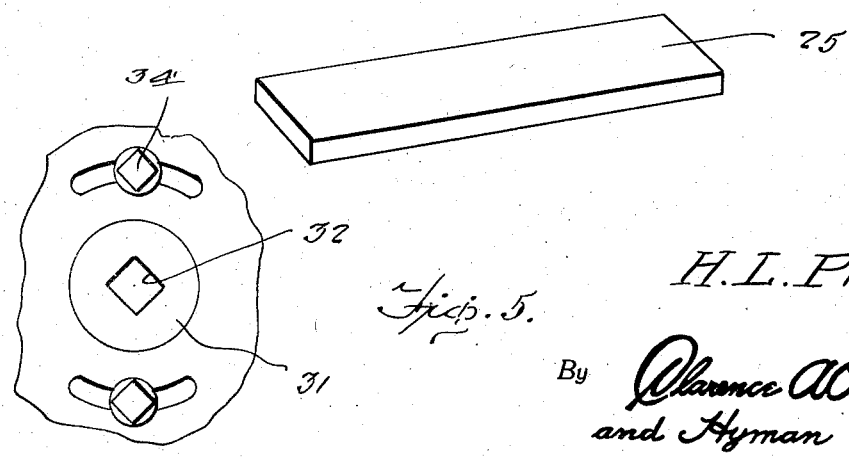
Fig. 4.
Fig. 5.
Inventor
H. L. Pray
By Clarence A. O'Brien
and Hyman Berman
Attorneys Patented Jan. 10, 1939

2,143,330

UNITED STATES PATENT OFFICE 2,143,330

AUTOMATIC WORM DRIVE BRAKE

Harley L. Pray, Tulsa, Okla.

Application June 9, 1938, Serial No. 212,813

5 Claims. (Cl. 188—82)

This invention relates to automatic worm drive brakes for winches and has for the primary object the provision of an efficient, durable and inexpensive device of this character which will provide a safety medium for a winch to prevent the latter from releasing its load should the power medium fail from any cause, the construction of the device being compact and easily adapted to worm drives of the winches without undue alteration in the construction of the latter and without materially increasing the manufacturing and maintenance cost of the winch.

With these and other objects in view, the invention consists in certain novel features of construction, combination and arrangement of parts to be hereinafter more fully described and claimed.

For a complete understanding of my invention, reference will be had to the following description and accompanying drawings, in which Figure 1 is a fragmentary transverse sectional view showing a part of a worm drive of a winch equipped with an automatic brake constructed in accordance with my invention.

Figure 2 is a sectional view taken on line 2—2 showing the brake construction with the brake shoes in released position.

Figure 3 is a vertical sectional view showing the brake and its connection to the worm shaft.

Figure 4 is a perspective view illustrating one of the brake shoe plates.

Figure 5 is a fragmentary plan view showing the cover of the brake housing.

Figure 1:
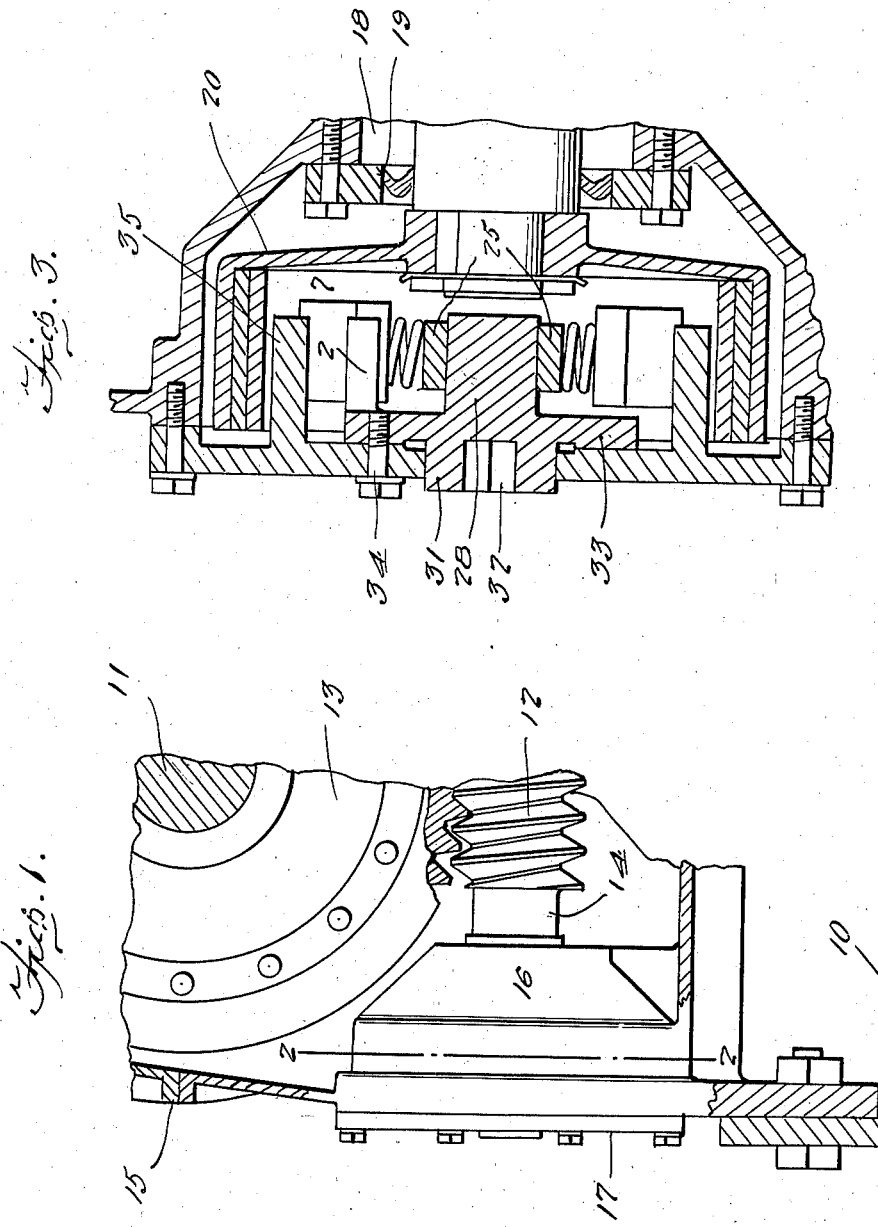

Referring in detail to the drawings, the numeral 10 indicates a fragmentary portion of a standard type winch wherein the driven shaft of said winch is indicated by the character 11, being driven from a power source (not shown) through the medium of a worm 12 and a worm gear 13. The worm gear 13 is secured on the shaft 11 while the worm 12 forms an integral part of a power shaft 14 connected to the power source in any well known manner. The winch includes a supporting structure 15 in which is mounted a durable and compact brake housing 16 having a removable cover plate 17. The brake housing has an opening 18 in which extends the shaft 14 of the worm 12. The housing 16 carries a suitable packing gland 19 engageable with the shaft 14 to prevent the entrance of foreign matter to said housing. The end of the shaft 14 which is located in the housing 16 has detachably secured thereon a brake drum 20 and associated with the latter are opposed arcuately curved brake shoes 21 equipped with a lining 22 to engage with the brake drum. The brake shoes have pockets 23 in which are seated coiled springs 24 that rest on bars or plates 25 arranged in spaced parallel relation with the ends thereof loosely mounted in sockets or recesses 26 formed in the brake shoes adjacent the ends of the latter. The pockets 23 also form abutments to be engaged by stop fingers 27 carried by a cam 28 having opposed high faces 29 and opposed low faces 30. In other words, the cam is substantially elliptical shape in cross section, as clearly shown in Figure 2, with the bars or plates 25 in engagement therewith. The cam 28 includes a head 31 extending through an opening in the cover plate 17 and provided with a tool receiving socket 32. The cam also includes a flange 33 on which the stop fingers 27 are formed and has screw threaded openings to receive stud bolts 34 which operate in arcuately curved slots formed in the cover plate. With the stud bolts tightly turned against the cover plate the cam is secured in any of its adjusted positions. To adjust the cam the stud bolts 34 are released and a suitable tool is inserted in the socket 32 and the cam rotated in the desired direction. The purpose of adjustment of the cam 28 is to increase and decrease the action of the springs 24 on the brake shoes.

Formed on the cover plate and extending inwardly of the drum are protecting or guard elements 35 for the fingers 27.

When the winch is operating under a load and being driven from the power source through the worm 12 and worm gear 13, the brake drum 20 rotates in the direction indicated by the arrow in Figure 2. The brake shoes have a slight drag on the drum, consequently the tendency of the brake shoes is to follow the rotation of the drum, as indicated by the arrow. However, the brake shoes are prevented from rotating in said direction with the drum through the pockets 23 abutting the fingers 27, consequently preventing the brake shoes from going into brake applying position. Should the power fail and the winch start to release its load bringing a reverse rotation to the drum 20 from the direction indicated by the arrow in Figure 2, the brake shoes having a slight drag with the brake drum follow the rotation of said brake drum in a reverse direction moving away from the fingers and bringing about a movement of the plates 25 off of the low faces 30 of the cam and onto the high faces of the cam. The plates moving onto the high faces of the cam increases the tension of the springs consequently forcing the brake shoes tightly against the drum and stopping the rotation of the winch in a reverse direction or in a direction of releasing its load. Thus it will be seen that the brakes automatically apply immediately on failure of the power and the starting of the winch to release its load and on the application of the power again to the winch the brakes become automatically released due to the brake shoes or pockets thereof moving in engagement with the fingers 27. Thus it will be seen that the construction and operation of this invention is practical, simple and durable and the mounting of the housing 16 is such that it will be capable of withstanding severe strain, also forms an effective closure for the brake mechanism to exclude foreign matter therefrom. When the brake linings wear the cam can be easily adjusted to compensate for wear in the brake linings, thus permitting the brakes to be easily maintained in an efficient order. Due to the simplicity of the construction involved in this invention and the ease in which it can be readily adapted to a winch it will not materially increase the manufacturing cost of the latter nor the maintenance cost.

It is believed that the foregoing description, when taken in connection with the drawings will fully set forth the construction and advantages of this invention to those skilled in the art to which such invention relates so that further detailed description will not be required.

Having described the invention, what I claim is:

1. In combination with a worm drive of a winch including a worm shaft, a brake drum secured on said shaft, brake shoes to engage said drum and tending to follow the rotation thereof, a housing for said drum, a cam carried by said housing, and means between said cam and the brake shoes to automatically bring about the application of the brake shoes on the drum by the rotation of said drum under the influence of a load on the winch due to failure of operation of the drive means of the winch.

2. In combination with a worm drive of a winch including a worm shaft driven by a power source, a brake drum secured on said shaft, a housing for said brake drum, brake shoes to engage said drum and tending to follow the rotation thereof, a cam carried by said housing, stop means carried by said cam for preventing the rotation of the brake shoes with the drum in the rotation of said drum by the power source, and means between the brake shoes and the cam to automatically bring about the application of the brake shoes on the drum by the failure of the power source from any cause and due to the rotation of the drum in a reverse direction under the influence of a load on the winch.

3. In combination with a worm drive of a winch including a worm shaft driven by a power source, a brake drum secured on said shaft, a housing for said brake drum, brake shoes to engage said drum and tending to follow the rotation thereof, a cam carried by said housing, stop means carried by said cam for preventing the rotation of the brake shoes with the drum in the rotation of said drum by the power source, and a yieldable means connecting said brake shoes with said cam for automatically applying the brake shoes against the drum on the failure of the power source to operate and the rotation of the drum in a reverse direction under the influence of the load on the winch.

4. In combination with a worm drive of a winch including a worm shaft driven by a power source, a brake drum secured on said shaft, a fixed housing receiving said drum, brake shoes to engage said drum and tending to follow the rotation thereof, a cam adjustably mounted on said housing and arranged between the brake shoes, stop fingers carried by said cam for preventing rotation of the brake shoes with said drum during the rotation of the latter by the power source, plates engageable with said cam and carried by said shoes, springs between said plates and shoes to cooperate with the plates in effecting application of the brake shoes by the cam on the reverse rotation of the drum under the influence of the load on the winch and the failure of operation of the power source from some cause.

5. In combination with a wind drive of a winch including a worm shaft, a brake drum secured on said shaft, brake shoes to engage said drum and tending to follow the rotation thereof, a housing for said drum, a cam in said housing, means between said cam and the brake shoes to automatically bring about the application of the brake shoes on the drum by the rotation of said drum under the influence of a load on the winch due to failure of operation of the drive means of the winch, and means for adjustably mounting the cam in the housing to compensate for wear on the brake shoes.

HARLEY L. PRAY.